US012061684B2

United States Patent
Hughes et al.

(10) Patent No.: US 12,061,684 B2
(45) Date of Patent: Aug. 13, 2024

(54) SYSTEMS AND METHODS FOR CONTROLLING ACCESS TO A COMPUTING DEVICE

(71) Applicant: Shopify Inc., Ottawa (CA)

(72) Inventors: Michael Hughes, Ottawa (CA); Francisco Afonso Cavedon, Mississauga (CA); Mir Mustafa Ali, Markham (CA); Tarika Chawla, Milton (CA); Alexandre Kaliazine, Toronto (CA)

(73) Assignee: Shopify Inc., Ottawa (CA)

( * ) Notice: Subject to any disclaimer, the term of this patent is extended or adjusted under 35 U.S.C. 154(b) by 119 days.

(21) Appl. No.: 17/548,905

(22) Filed: Dec. 13, 2021

(65) Prior Publication Data

US 2023/0185892 A1    Jun. 15, 2023

(51) Int. Cl.
   G06F 21/40    (2013.01)
   G06F 21/60    (2013.01)
   H04L 9/06     (2006.01)
   H04L 9/32     (2006.01)
   G06F 21/10    (2013.01)

(52) U.S. Cl.
   CPC ............ G06F 21/40 (2013.01); G06F 21/602 (2013.01); H04L 9/0656 (2013.01); H04L 9/3226 (2013.01); *G06F 21/107* (2023.08)

(58) Field of Classification Search
   CPC .................. G06F 21/40; G06F 21/602; G06F 2221/0755; H04L 9/3226; H04L 9/0656
   USPC ......................................................... 713/182
   See application file for complete search history.

(56) References Cited

U.S. PATENT DOCUMENTS

| 8,079,068 | B2* | 12/2011 | Adams ................. H04W 12/06 726/20 |
| 9,665,704 | B2* | 5/2017 | Beatson ............... H04L 9/3231 |
| 2001/0047341 | A1* | 11/2001 | Thoone ................... G06F 21/10 713/160 |
| 2005/0005121 | A1 | 1/2005 | Chen et al. |
| 2013/0013928 | A1* | 1/2013 | Thom .................... G06F 21/30 713/182 |
| 2015/0213278 | A1 | 7/2015 | Thom et al. |
| 2015/0244522 | A1* | 8/2015 | Cheruvath ............. G06F 21/31 713/183 |

(Continued)

OTHER PUBLICATIONS

Zuo, "IoT-Based Intelligent Perception and Access of Manufacturing Resource Toward Cloud Manufacturing", May 2014, IEEE, pp. 1547-1556 (Year: 2014).*

(Continued)

*Primary Examiner* — Piotr Poltorak
*Assistant Examiner* — Gregory A Lane
(74) *Attorney, Agent, or Firm* — Rowand LLP

(57) ABSTRACT

A computer-implemented method is disclosed. The method includes: receiving, via a computing device in a locked state, input of a first PIN; determining that the first PIN is associated with a first cryptographic key that is stored in a memory; responsive to determining that the first PIN is associated with the first cryptographic key, retrieving, from the memory, an encrypted form of a first credential that is associated with the first cryptographic key; recovering the first credential from the encrypted form using the first cryptographic key; and causing the computing device to be unlocked using the recovered first credential.

21 Claims, 7 Drawing Sheets

(56) References Cited

U.S. PATENT DOCUMENTS

2017/0104739 A1* 4/2017 Lansler ................. H04L 63/067
2019/0245916 A1* 8/2019 Abalyaev .............. H04L 63/065
2020/0019324 A1* 1/2020 Wang .................... G06F 3/0655

OTHER PUBLICATIONS

Raj, "fTPM: A Software-Only Implementation of a TPM Chip", Aug. 2016, USENIX, pp. 841-855 (Year: 2016).*
International Search Report & Written Opinion dated Mar. 20, 2023; WIPO Application No. PCT/CA2022/051805.
C. Percival Tarsnap, S. Josefsson—Internet Engineering Task Force (IETF); The scrypt Password-Based Key Derivation Function; ISSN: 2070-172; retrieved from http://www.rfc-editor.org/info/rfc7914; pp. 1-16, Aug. 2016.

* cited by examiner

FIG. 8

SYSTEMS AND METHODS FOR CONTROLLING ACCESS TO A COMPUTING DEVICE

TECHNICAL FIELD

The present disclosure relates to device security and, in particular, to controlling user access to computing devices.

BACKGROUND

Computing devices typically support implementations of a lock screen for regulating user access to the device. A lock screen prevents use of the device when in a locked state, and requires a user to perform a certain action (e.g., input of a password, gesture, biometrics, etc.) in order to gain access to (or "unlock") the device. A lock screen can range from a simple login screen prompting for login credentials to an overview screen displaying device and context information.

Lock screen implementations may vary across device types. For certain personal devices, such as smartphones, laptops, and the like, a single password may be set for unlocking the device. Such a "one-password" scheme for device unlock may not be suitable for other types of devices that may be used by multiple users (e.g., point-of-sale devices).

BRIEF DESCRIPTION OF THE DRAWINGS

Embodiments will be described, by way of example only, with reference to the accompanying figures wherein:

FIG. 8 is an example of a home page of an administrator, in accordance with an example embodiment.

Like reference numerals are used in the drawings to denote like elements and features.

DETAILED DESCRIPTION OF EMBODIMENTS

Figure 1:
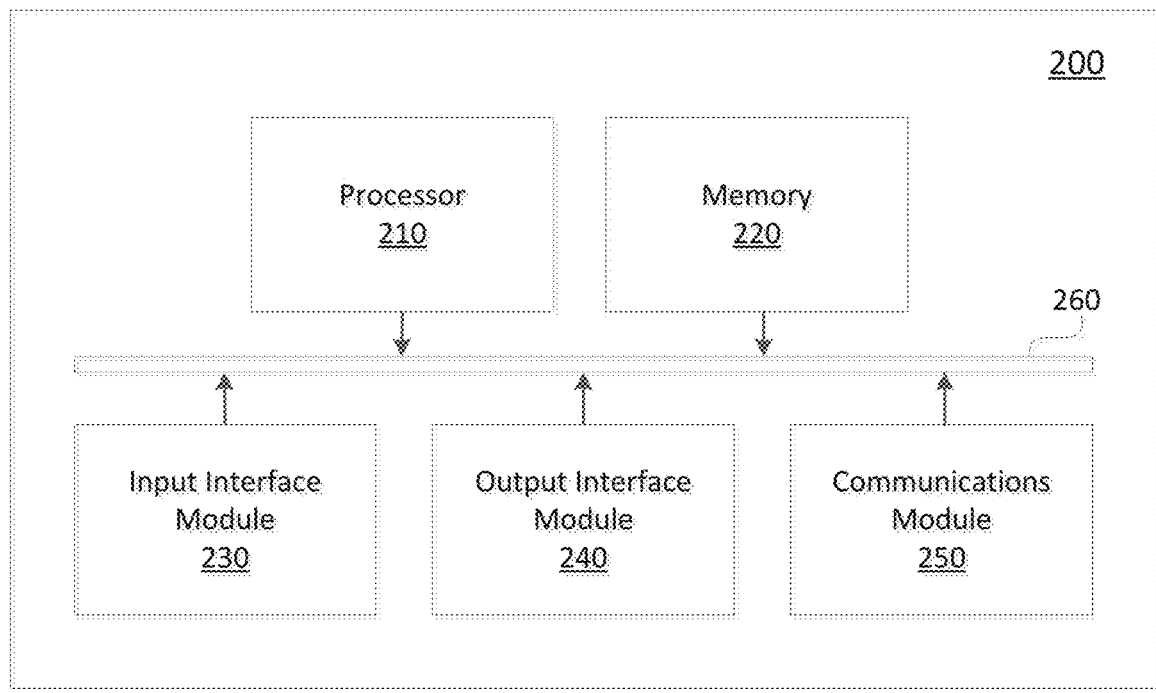
FIG. 1 is a high-level schematic diagram of a computing device.

In an aspect, the present application discloses a computer-implemented method. The method includes: receiving, via a computing device in a locked state, input of a first PIN; determining that the first PIN is associated with a first cryptographic key that is stored in a memory; responsive to determining that the first PIN is associated with the first cryptographic key, retrieving, from the memory, an encrypted form of a first credential that is associated with the first cryptographic key; recovering the first credential from the encrypted form using the first cryptographic key; and causing the computing device to be unlocked using the recovered first credential.

In some implementations, recovering the first credential may include decrypting the encrypted form using the first cryptographic key.

In some implementations, determining that the first PIN is associated with the first cryptographic key may include: computing a unique value based on the first PIN; obtaining a ciphertext based on encrypting the first cryptographic key using the unique value; and comparing encrypted forms of one or more stored cryptographic keys that are encrypted using the unique value with the ciphertext to identify a match.

In some implementations, computing the hash value may include applying a key derivation function to an input that represents a combination of the first PIN and a device identifier associated with the computing device.

In some implementations, determining that the first PIN is associated with the first cryptographic key may include querying a lookup table stored in the memory to identify a cryptographic key that is stored in association with the first PIN.

In some implementations, the first cryptographic key may be a randomly-generated key.

In some implementations, the method may further include: receiving a plurality of authorized PINs associated with the computing device; for each of the plurality of authorized PINs: generating a random key; and storing the random key in association with the authorized PIN in the memory.

In some implementations, the method may further include: for each of the stored random keys: encrypting the first credential using the random key to obtain an encrypted first credential; and storing, in the memory, the encrypted first credential in association with the random key.

In some implementations, the method may further include: for each of the plurality of authorized PINs: computing a hash value based on the authorized PIN; encrypting the random key that is stored in association with the authorized PIN using the computed hash value; and storing, in the memory, the encrypted random key.

In some implementations, the method may further include: receiving a request to update a first authorized PIN associated with the computing device; in response to receiving the request: identifying one or more keys that are stored in the memory in association with the first authorized PIN; deleting the identified keys from the memory; and generating new keys associated with the first authorized PIN.

In another aspect, the present application discloses a computing device. The computing device includes a processor and a memory coupled to the processor. The memory stores computer-executable instructions that, when executed by the processor, are to cause the processor to: receive, in a locked state of the computing device, input of a first PIN; determine that the first PIN is associated with a first cryptographic key that is stored in a memory; responsive to determining that the first PIN is associated with the first cryptographic key, retrieve, from the memory, an encrypted form of a first credential that is associated with the first cryptographic key; recover the first credential from the encrypted form using the first cryptographic key; and cause the computing device to be unlocked using the recovered first credential.

In yet another aspect, a non-transitory, computer readable storage medium is disclosed. The computer readable storage medium contains instructions thereon which, when executed by a processor, are to cause the processor to: receive, in a locked state of the computing device, input of a first PIN; determine that the first PIN is associated with a first cryptographic key that is stored in a memory; responsive to determining that the first PIN is associated with the first cryptographic key, retrieve, from the memory, an encrypted form of a first credential that is associated with the first cryptographic key; recover the first credential from the encrypted form using the first cryptographic key; and cause the computing device to be unlocked using the recovered first credential.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and associated payment requests, via an e-commerce platform, and the e-commerce platform may be equipped with transaction/payment processing components or delegate such processing activities to one or more third-party services. An e-commerce platform may be extendible/extensible by connecting one or more additional sales channels representing platforms where products can be sold. In particular, the sales channels may themselves be e-commerce platforms, such as Facebook Shops™, Amazon™, etc.

Access Control on a Computing Device

A lock screen prevents unauthorized use of a computing device. Existing solutions for regulating device access using a lock screen are limited. In certain personal devices (e.g., smartphones, laptops, etc.), a single password may be designated for unlocking the device. That is, only one password may grant access to the device. The "one-password" scheme for device unlock does not scale well for devices that may have multiple users, such as a point-of-sale (POS) device. Password sharing poses an increased risk to device security, as a shared password may be more exposed to being stolen or leaked. Moreover, the one-password scheme does not allow for differentiating between the users that access the device. If all authorized users of a device used the same password for unlocking the device, the device may not be able to track and distinguish user data (e.g., device activity) for the different users effectively. For example, a one-password scheme may not be suitable for a POS device, as it would not be possible to distinguish between users of the device for the purpose of attributing sales to store staff, without additional information such as employee identifiers (e.g., name, identification number, etc.).

On the other hand, a solution that relies on maintaining multiple user accounts on a single device, each with a different authentication profile, can be costly. For example, the Android™ operating system's native implementation of multi-user capability involves creating a separate user account for each user of a device and maintaining application data for all of the user accounts. This approach for managing device access can be expensive in terms of its memory footprint and may result in generating a significant amount of redundant data. Furthermore, the number of user accounts that can be created on a device may be an implementation detail that is left to the device manufacturer. As a result, the number of authentication profiles (e.g., number of users with different login credentials) for a device may be limited and unchangeable at the device side.

The present application describes solutions that address some of the technical limitations associated with regulating access to multi-user computing devices. Specifically, a mechanism for configuring a lock screen of a computing device for use with multiple different authentication credentials (e.g., PINs, passcodes, patterns, biometrics, etc.) is proposed. The proposed mechanism may be integrated with the native security framework of an operating system running on a device to implement a lock screen that can be unlocked using multiple authentication credentials. The operating system may employ a user account model in which each user account/profile is associated with a single master unlock credential (e.g., password). The proposed lock screen implementation may be integrated with the operating system's user account model by mapping different authentication credentials to the single master unlock credential for a user account, thereby allowing multiple authentication credentials to unlock the device and access the same account. In particular, the proposed lock screen implementation allows the device to be accessed by multiple authorized users (i.e., users with valid registered credentials) without having to maintain separate user accounts or authentication profiles for the users.

In accordance with example embodiments, a mapping is created between the set of all authentication credentials that are authorized for unlocking a device and a system-generated primary credential that enables a lock screen and encrypts the device. Specifically, for each authentication credential, a unique value is obtained based on the authentication credential and the primary credential. The set of values obtained in this manner are stored in association with their corresponding authentication credentials in a memory of the device (e.g., in a lookup table). In particular, these mappings may be stored in a hardware-secured area of the device, which may offer a similar level of security as a standard password implementation. When processing subsequent requests to unlock the device, the stored values are used in verifying whether a valid authentication credential has been inputted.

FIG. 1 is a high-level operation diagram of an example computing device 200. The example computing device 200 includes a variety of modules. For example, the example computing device 200 may include a processor 210, a memory 220, an input interface module 230, an output interface module 240, and a communications module 250. As illustrated, the foregoing example modules of the example computing device 200 are in communication over a bus 260.

The processor 210 is a hardware processor. The processor 210 may, for example, be one or more ARM, Intel x86, PowerPC processors, or the like.

The memory 220 allows data to be stored and retrieved. The memory 220 may include, for example, random access memory (RAM), read-only memory (ROM), and persistent storage. Persistent storage may be, for example, flash memory, a solid-state drive, or the like. Read-only memory and persistent storage are a computer-readable medium. A computer-readable medium may be organized using a file system such as may be administered by an operating system governing overall operation of the example computing device 200. Some data that is saved to memory 220 may be stored in RAM and other data that is saved to memory 220 may be stored in persistent storage.

The input interface module 230 allows the example computing device 200 to receive input signals. Input signals may, for example, correspond to input received from a user. The input interface module 230 may serve to interconnect the example computing device 200 with one or more input devices. Input signals may be received from input devices by the input interface module 230. Input devices may, for example, include one or more of a touchscreen input, keyboard, trackball or the like. In some embodiments, all or a portion of the input interface module 230 may be integrated with an input device. For example, the input interface module 230 may be integrated with one of the aforementioned example input devices.

The output interface module 240 allows the example computing device 200 to provide output signals. Some output signals may, for example, allow provision of output to a user. The output interface module 240 may serve to interconnect the example computing device 200 with one or more output devices. Output signals may be sent to output devices by output interface module 240. Output devices may include, for example, a display screen such as, for example, a liquid crystal display (LCD), a touchscreen display. Additionally, or alternatively, output devices may include devices other than screens such as, for example, a speaker, indicator lamps (such as, for example, light-emitting diodes (LEDs)), and printers. In some embodiments, all or a portion of the output interface module 240 may be integrated with an output device. For example, the output interface module 240 may be integrated with one of the aforementioned example output devices.

The communications module 250 allows the example computing device 200 to communicate with other electronic devices and/or various communications networks. For example, the communications module 250 may allow the example computing device 200 to send or receive communications signals. Communications signals may be sent or received according to one or more protocols or according to one or more standards. For example, the communications module 250 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 250 may allow the example computing device 200 to communicate using near-field communication (NFC), via Wi-Fi™, using Bluetooth™ or via some combination of one or more networks or protocols. Contactless payments may be made using NFC. In some embodiments, all or a portion of the communications module 250 may be integrated into a component of the example computing device 200. For example, the communications module may be integrated into a communications chipset.

Software comprising instructions is executed by the processor 210 from a computer-readable medium. For example, software may be loaded into random-access memory from persistent storage of memory 220. Additionally, or alternatively, instructions may be executed by the processor 210 directly from read-only memory of the memory 220.

Figure 2:
FIG. 2 shows a simplified organization of software components stored in a memory of the computing device of FIG. 1.

FIG. 2 depicts a simplified organization of software components stored in memory 220 of the example computing device 200. As illustrated, these software components include, at least, application software 270 and an operating system 280.

The application software 270 adapts the example computing device 200, in combination with the operating system 280, to operate as a device performing a particular function. While a single application software 270 is illustrated in FIG. 2, in operation, the memory 220 may include more than one application software and different application software may perform different operations.

The operating system 280 is software. The operating system 280 allows the application software 270 to access the processor 210, the memory 220, the input interface module 230, the output interface module 240 and the communications module 250. The operating system 280 may, for example, be iOS™, Android™, Linux™, Microsoft Windows™, or the like.

The operating system 280 provides various system services for the example computing device 200. User authentication services 282 includes a suite of services relating to credential enrollments and authentication of device users. For example, user authentication services 282 may include initial enrollment of credentials (e.g., PIN, pattern, password, or the like), credentials management, and processing of authentication tokens. Lock screen management services 284 relate to enabling, disabling, and modifying lock screens on the example computing device 200, and may include graphical user interface (GUI) control, display management, user input processing, and device unlock support.

A key store represents a storage facility for cryptographic keys and certificates. The operating system 280 may implement a key store system that allows cryptographic keys to be stored in a container to make it difficult to extract the keys from the device. Once keys are in a key store, they can be used for cryptographic operations with the key material remaining non-exportable. Key store services 286 include services relating to on-device management of cryptographic keys, and may include key generation, import and export of keys, key store access control, key use authorizations, and digital signature functions (e.g., encryption and decryption).

In some implementations, the key store of a computing device may be implemented as a hardware-backed key store. In particular, key material may be bound to secure hardware of the computing device. For example, the key store may be implemented in a "trusted execution environment" (TEE), a secure area on a main processor of the device where code can execute securely and in isolation. In the Android™ operating system, the key store may be provided in an isolated computing environment as a component on a device's motherboard. As another example, the device may support a key store that is implemented in a hardware security module, a physical device having a discrete processing unit, secure storage, and tamper-resistant packaging.

While FIGS. 3 to 6 illustrate methods which make reference to personal identification numbers (PINs), it will be understood that the disclosed methods are applicable to other forms of credentials for confirming identity, such as passcodes, patterns, biometrics, and the like. For example, in some embodiments, the methods 300 to 600 may be implemented using numerical representations of passcodes, patterns, or biometric data in place of PINs.

Figure 3:
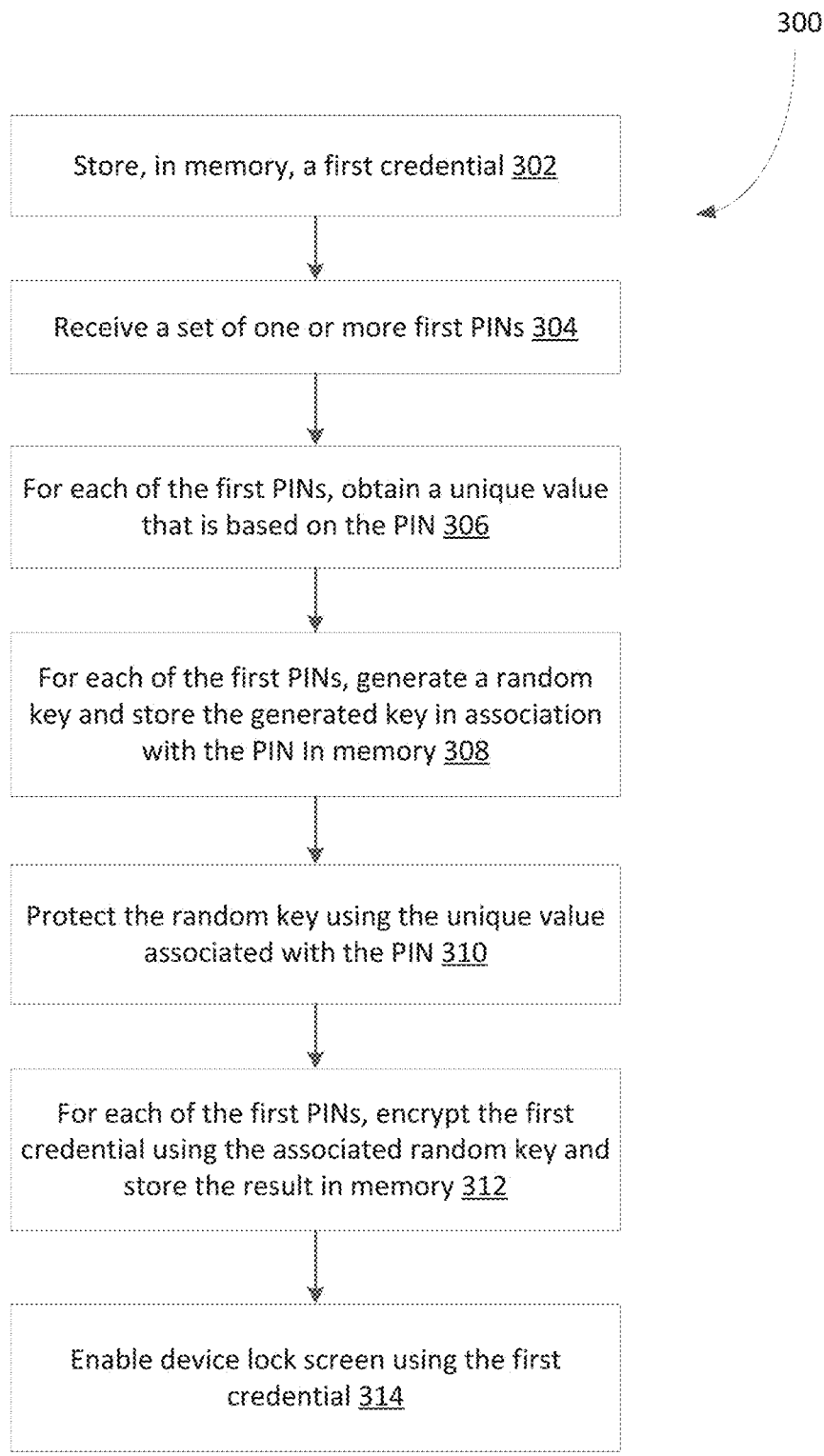
FIG. 3 shows, in flowchart form, an example method for enabling a lock screen on a computing device.

Reference is now made to FIG. 3, which shows, in flowchart form, an example method 300 for enabling a lock screen on a computing device. The method 300 may be implemented as part of a process for authenticating users to access a computing device. In particular, the method 300 (or parts thereof) may be integrated with a native security framework of an operating system that is running on a computing device. For example, one or more system services of an operating system that are responsible for managing user authentication on the device may be modified to implement the operations of method 300.

Operations starting with operation 302 and continuing onward may be performed, for example, by a processor of a computing device, such as the example computing device 200 of FIG. 1, executing software comprising instructions stored in memory (such as memory 220 of FIG. 1) of the computing device. Specifically, processor-executable instructions may, when executed, configure a processor of a computing device to perform all or parts of the method 300.

A lock screen of a computing device may be enabled during a first boot sequence of the device (e.g., after a factory reset), or during operation of the device subsequent to the first boot. Once a lock screen is enabled, the device may be encrypted. In particular, device data (including user-created data) of the device may be encrypted, for example, by encoding the data using symmetric encryption keys.

In at least some implementations, a single credential (e.g., a password, PIN code, biometrics, etc.) may be used to enable a lock screen and encrypt the device. As described above, an operating system may employ a user account model in which each user account on the computing device is associated with a single device unlock credential. The unlock credential may be initially selected by an administrator (i.e., a user with device administrator privileges) or an authorized user of the computing device. Once selected, this unlock credential (hereinafter referred to as "first credential") is stored in memory of the computing device, in operation 302.

In operation 304, the computing device receives a set of one or more first PINs. The first PINs include PINs associated with authorized users of the computing device. In particular, the first PINs are the PINs that are to be used by authorized users for gaining access to, or unlocking, the computing device. For example, the computing device may be a point-of-sale (POS) device, and each store staff that is authorized to access the POS device may be associated with a respective one of the first PINs.

In at least some embodiments, the first PINs may all be unique, i.e., no two first PINs are the same. In this way, each of the first PINs may uniquely identify an authorized user of the computing device. The first PINs may be received via an input interface associated with the computing device. For example, the first PINs may be inputted using a keyboard interface (physical or virtual) of the computing device.

For each of the first PINs, the computing device obtains a unique value that is based on the PIN, in operation 306. In at least some embodiments, the unique value represents a derived value that is obtained based on combining the PIN with some other static information. The static information may, for example, be device identifying information for the computing device, such as a device serial number. The computing device may combine the PIN with the device serial number (for example, using standard string concatenation). The combined information may be set as the argument of a selected function, and the output of the function may be set as the unique value associated with the PIN. In some embodiments, the selected function may be a cryptographic hash function. For example, the selected function may be a key derivation function, such as the "scrypt" algorithm, that derives secret keys from a secret value, for example, using a pseudorandom function. The password-based key derivation function "scrypt" was standardized by the Internet Engineering Task Force, or IETF, in RFC 7914 (August 2016), which is incorporated herein by reference. Certain operating systems (e.g., Android™) may provide a reference implementation of the scrypt algorithm. Other key derivation functions, such as bcrypt, Lyra2, and Argon2, may be used as the selection function in operation 306.

In addition to obtaining the unique values, for each of the first PINs, the computing device generates a random key and stores the generated key in association with the PIN, in operation 308. For example, a key may be randomly generated using a random number generator or pseudorandom number generator, and saved to a lookup table in association with a corresponding one of the first PINs. Once the key corresponding to the PIN is generated, the computing device protects the key using the unique value associated with the PIN, in operation 310. In at least some embodiments, the key is protected by encrypting the key with the associated unique value based on an encryption algorithm (such as the 256-bit Advanced Encryption Standard (AES) encryption).

For each of the first PINs, the computing device encrypts the first credential (of operation 302) using the key associated with the PIN, and stores the result in memory, in operation 312. In particular, each ciphertext that is derived based on encrypting the first credential using a key corresponding to a respective one of the first PINs is stored in memory of the computing device.

Once all of the first PINs have been processed (i.e., through operations 306 to 312), the computing device enables a lock screen using the first credential, in operation 314. Specifically, a user interface element for preventing unauthorized access to the computing device and its data is caused to be displayed on a display associated with the computing device. The lock screen may, for example, be the operating system's default implementation of a lock screen. The first credential is set as a "master" password for unlocking the lock screen. In particular, the first credential represents a unique unlock credential that is set in compliance with the operating system's user account model for accessing a specific user account. Thus, while only the first credential may be used to enable the operating system's implementation of a lock screen, multiple different PINs may be used for unlocking the computing device.

In at least some embodiments, the lock screen may be enabled in response to a certain detected trigger event on the computing device. For example, the lock screen may be displayed on a display of the computing device upon detecting a screen timeout, press of a power button, device reboot, or the like.

Figure 4:
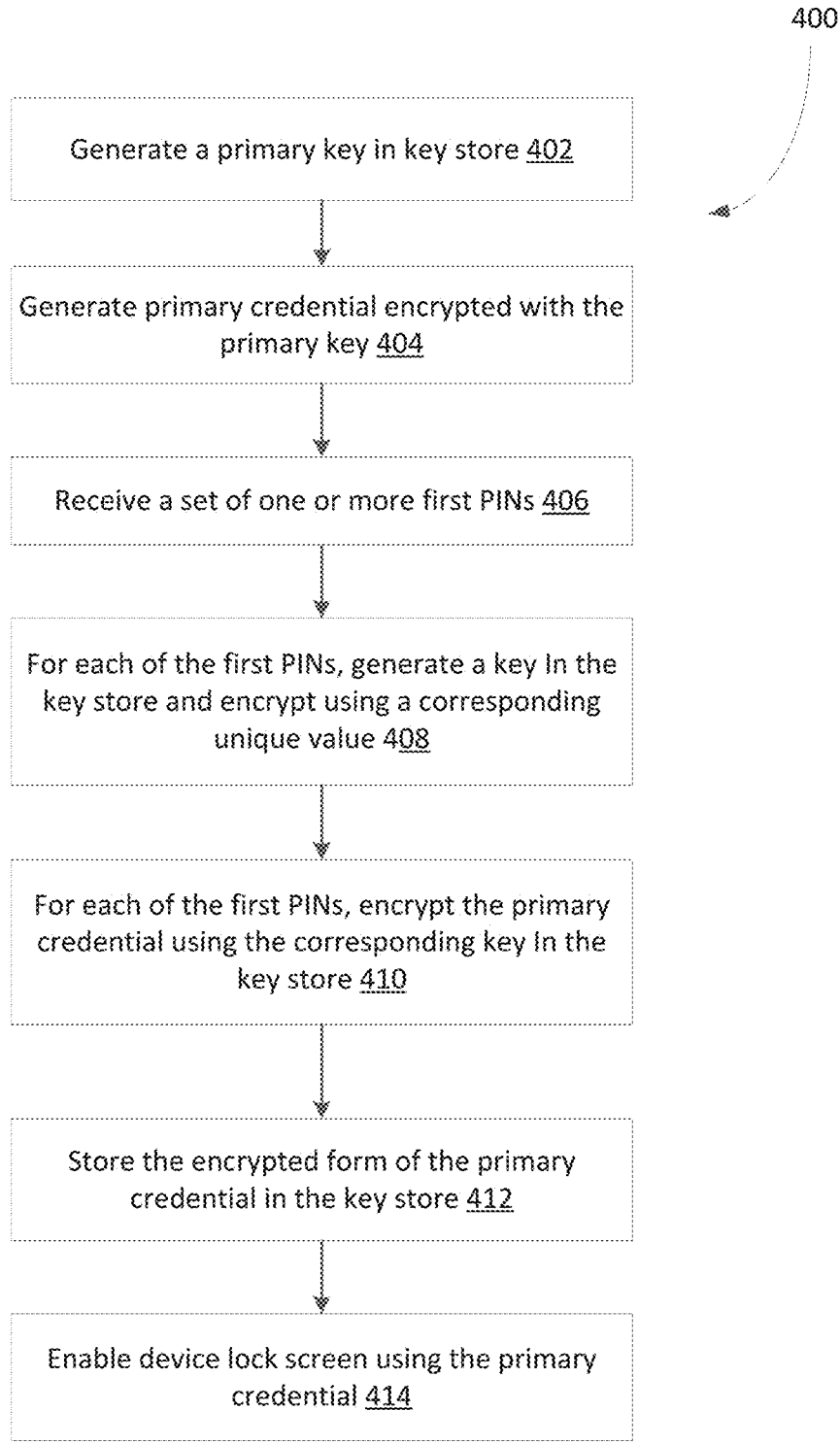
FIG. 4 shows, in flowchart form, another example method for enabling a lock screen on a computing device.

Reference is now made to FIG. 4, which shows, in flowchart form, another example method 400 for enabling a lock screen on a computing device. The method 400 may be implemented as part of a process for authenticating users to access a computing device. In particular, the method 400 (or parts thereof) may be integrated with a native security framework of an operating system that is running on a computing device.

Operations starting with operation 402 and continuing onward may be performed, for example, by a processor of a computing device, such as the example computing device 200 of FIG. 1, executing software comprising instructions stored in memory (such as memory 220 of FIG. 1) of the computing device. Specifically, processor-executable instructions may, when executed, configure a processor of a computing device to perform all or parts of the method 400.

The method 400 may be performed at least partially by a key store implementation on the computing device. In particular, a processor of a computing device may leverage use of a key store of the computing device in performing the method 400. The operations of method 400 may be performed in addition to, or as alternatives of, one or more of the operations of method 300.

The computing device obtains a first credential to set as a credential for unlocking the computing device. The first credential represents a unique unlock credential that is set in compliance with the operating system's user account model for accessing a specific user account. This first credential may be obtained by leveraging a key store that securely manages cryptographic keys on the computing device. In operation 402, the computing device generates a primary key in a key store of the computing device. The computing device then generates a primary credential (e.g., password) that is encrypted using the primary key, in operation 404. The encrypted primary credential is saved to disk; in particular, the encrypted primary credential need not be stored in the key store.

In operation 406, the computing device receives a set of one or more first PINs. The first PINs include PINs associated with authorized users of the computing device. In particular, the first PINs are the PINs that are to be used by authorized users for gaining access to, or unlocking, the computing device.

For each of the first PINs, the computing device generates a random key in the key store and encrypts the key using a unique value corresponding to the PIN, in operation 408. The generated key is stored in the key store in association with the PIN. The unique value corresponding to the PIN may be obtained in a similar manner as in method 300. In particular, the unique value may be obtained based on combining the PIN with some other static information (e.g., device identifying information, such as a serial number). The computing device may combine the PIN with the serial number, and the combined information may be set as the argument of a selected function, such as a cryptographic hash function (e.g., scrypt). The output of the function may then be set as the unique value corresponding to the PIN.

For each of the first PINs, the computing device encrypts the primary credential (of operation 404) using the corresponding key in the key store in operation 410, and stores the result in operation 412. In particular, each ciphertext that is derived based on encrypting the primary credential using a key corresponding to a respective one of the first PINs is stored in memory of the computing device. The encrypted form of the primary credential is stored in the key store (operation 412).

Once all of the first PINs have been processed (i.e., through operations 406 to 412), the computing device enables a lock screen using the first credential, in operation 414. Specifically, a user interface element for preventing unauthorized access to the computing device and its data is caused to be displayed on a display associated with the computing device. The lock screen may, for example, be the operating system's default implementation of a lock screen.

Figure 5:
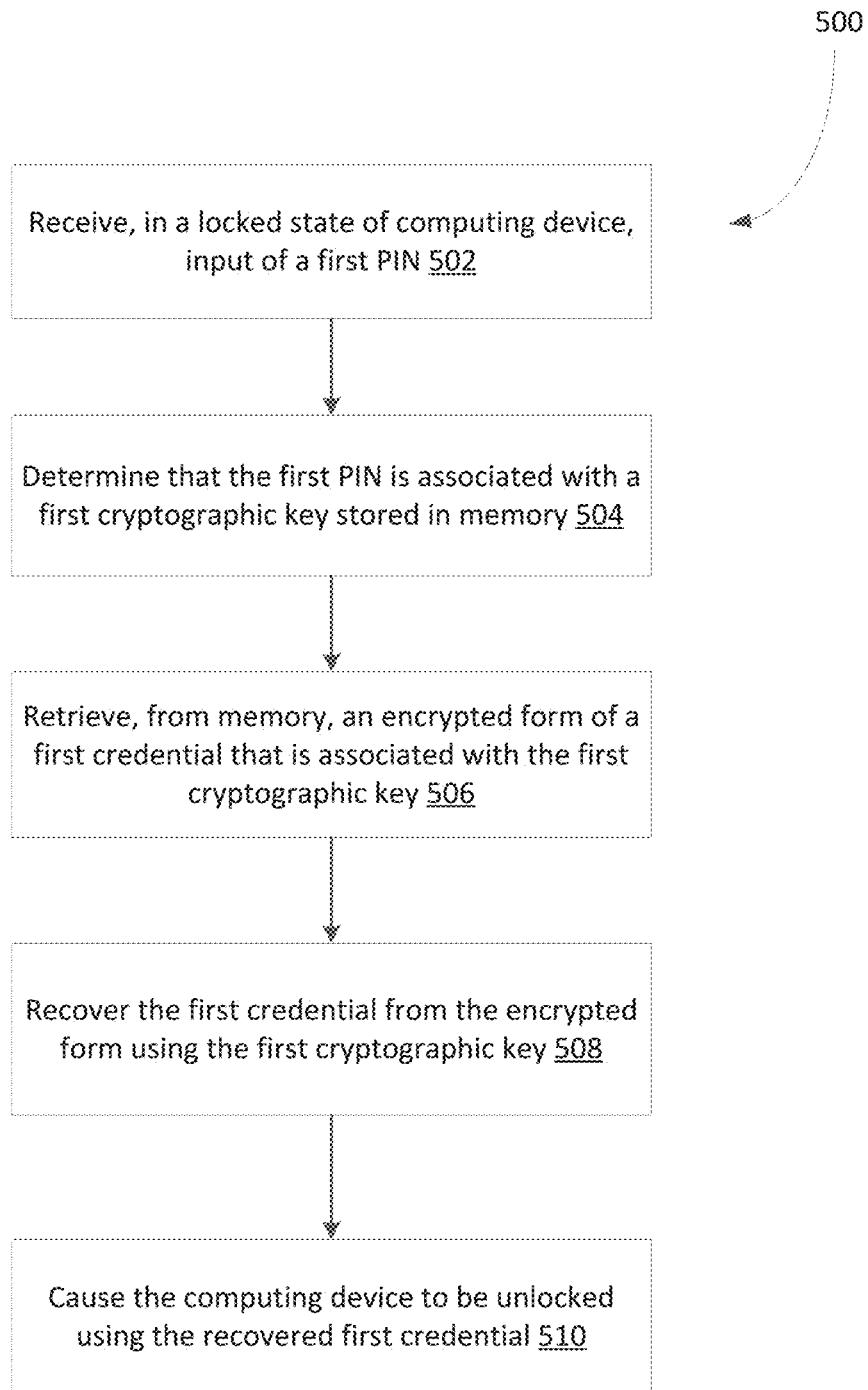
FIG. 5 shows, in flowchart form, an example method for processing a user request to unlock a computing device.

Reference is now made to FIG. 5, which shows, in flowchart form, an example method 500 for processing a user request to unlock a computing device. The method 500 may be implemented as part of a process for authenticating users to access a computing device. In particular, the method 500 may be performed by a computing device when processing a request to unlock a lock screen that has been enabled or set up in accordance with methods 300 and 400 described above. The method 500 (or parts thereof) may be integrated with a native security framework of an operating system that is running on a computing device.

Operations starting with operation 502 and continuing onward may be performed, for example, by a processor of a computing device, such as the example computing device 200 of FIG. 1, executing software comprising instructions stored in memory (such as memory 220 of FIG. 1) of the computing device. Specifically, processor-executable instructions may, when executed, configure a processor of a computing device to perform all or parts of the method 500.

In operation 502, the computing device receives, in a locked state of the computing device, input of a first PIN. The first PIN may be received via an input interface, such as a keyboard or touchscreen display, associated with the computing device. In particular, the first PIN may be included in a user request to gain access to the computing device in the locked state. For example, the first PIN may be inputted by a user on a lock screen interface in order to unlock the computing device.

The computing device determines that the inputted first PIN is associated with a first cryptographic key stored in memory, in operation 504. In at least some embodiments, the computing device may store a plurality of cryptographic keys corresponding to authorized PINs for the computing device. The authorized PINs may include PINs that are used by authorized users to unlock the computing device. The cryptographic keys may be stored, for example, in a key store of the computing device. Each stored cryptographic key may be protected (e.g., encrypted) using a unique value corresponding to a respective PIN. By obtaining a unique value corresponding to the inputted first PIN and querying a storage of cryptographic keys to check if any of the stored keys is protected using the unique value, the computing device may determine whether the first PIN is associated with a cryptographic key stored on the computing device.

By way of example, the computing device may obtain a first unique value corresponding to the first PIN by combining the first PIN with some static information, such as device identifying information for the computing device. For example, the first PIN and a serial number of the computing device may be combined (by standard concatenation), and the combined information may be set as the argument of a selected function. In some embodiments, the selected function may be a cryptographic hash function. For example, the selected function may be a key derivation function, such as the "scrypt" algorithm. The output of the selected function may be set as the first unique value.

Once the first unique value is determined, the computing device may iterate through the stored cryptographic keys to determine if any of the keys is protected using the first unique value. The computing device may store encrypted forms of a plurality of cryptographic keys corresponding to authorized PINs. In particular, each encrypted form may be an encryption of a stored cryptographic key using a unique value—obtained in a similar manner as the first unique value—that is associated with the PIN corresponding to the key. The computing device may iterate through the stored keys and obtain, for each key, a ciphertext based on encrypting the key using the first unique value. If the ciphertext matches a stored encrypted form of one of the cryptographic keys, the computing device determines that the first PIN is associated with said key.

If such a key is found, the first PIN is determined to be a valid PIN for unlocking the computing device; that is, the first PIN is a PIN associated with an authorized user of the computing device. Further, in response to determining that the first PIN is associated with the first cryptographic key, the computing device retrieves, from the memory, an encrypted form of a first credential that is associated with the first cryptographic key in operation 506. The first credential represents a unique unlock credential that is set in compliance with the operating system's user account model for accessing a specific user account. The first credential may be encrypted using keys corresponding to each of one or more authorized PINs for the computing device and the encrypted forms of the first credential may be stored on the computing device. The encryption of the first credential using the key corresponding to the first PIN is retrieved in operation 506.

In operation 508, the computing device recovers the first credential from the retrieved encrypted form using the first cryptographic key. In particular, the computing device may perform decryption (based on an encryption scheme, such as AES-256 or AES-512) of the encrypted form of the first credential with the first cryptographic key.

The computing device is then caused to be unlocked using the recovered first credential, in operation 510. For example, the computing device may process a login of an authorized user to a user account, or simply unlock the lock screen on the computing device.

If, however, a corresponding key for the first PIN is not found, the computing device determines that the inputted PIN is not a valid PIN, i.e., not authorized for unlocking the computing device. The computing device may generate an error code indicating that the inputted PIN is not valid. In some embodiments, the computing device may trigger an incorrect PIN condition on a lock screen of the computing device. For example, the computing device may generate display data for indicating that the inputted PIN is not valid.

Figure 6:
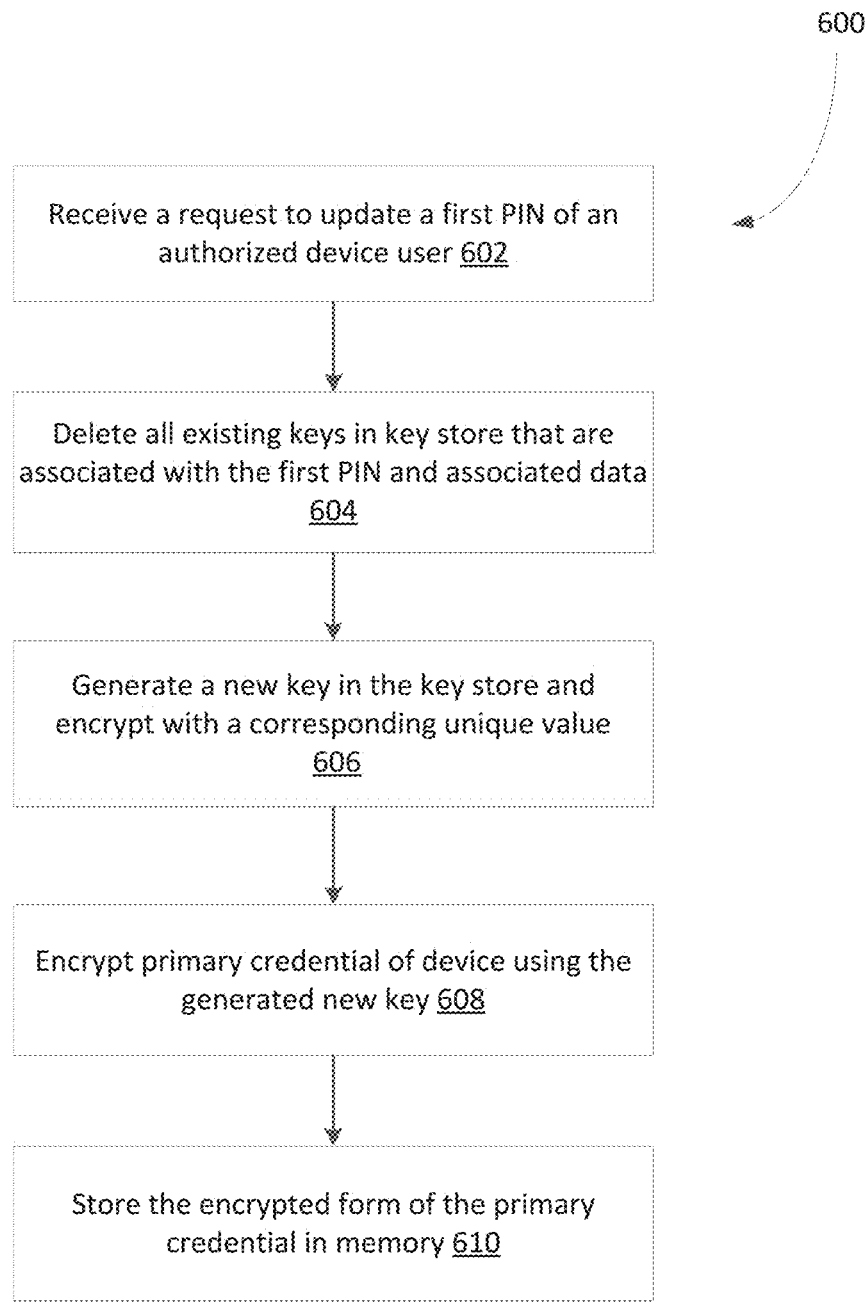
FIG. 6 shows, in flowchart form, an example method for changing existing device unlock credentials of authorized users of a computing device.

Reference is now made to FIG. 6, which shows, in flowchart form, an example method 600 for changing existing device unlock credentials of authorized users of a computing device. The method 600 may be implemented as part of a process for authenticating users to access a computing device. In particular, the method 600 may be performed by a computing device when processing a request to update an existing PIN for unlocking a lock screen that has been enabled or set up in accordance with the methods 300 and 400 described above. The method 600 (or parts thereof) may be integrated with a native security framework of an operating system that is running on a computing device.

Operations starting with operation 602 and continuing onward may be performed, for example, by a processor of a computing device, such as the example computing device 200 of FIG. 1, executing software comprising instructions stored in memory (such as memory 220 of FIG. 1) of the computing device. Specifically, processor-executable instructions may, when executed, configure a processor of a computing device to perform all or parts of the method 600.

In operation 602, the computing device receives a request to change an existing first PIN of an authorized user of the computing device. The request may be received from a user that has been authenticated to the computing device. For example, the request may only be processed upon determining that the request originates from an authorized user of the computing device. The request may include the first PIN and an indication of a desired action (e.g., change of an existing unlock PIN to the new PIN). In some embodiments, the request may also include a user-specified new PIN; alternatively, a new PIN may be automatically generated by the system and provided to the requesting user upon processing the request.

In operation 604, the computing device deletes all existing keys in a key store of the computing device that are associated with the first PIN. In particular, the computing device identifies at least one cryptographic key that is associated with the first PIN and deletes the identified at least one key. In at least some embodiments, each stored cryptographic key may be saved in association with a corresponding PIN and/or identifier of an authorized user, and the computing device may simply perform a lookup to identify the key(s) for deletion. The computing device additionally deletes any other data associated with the identified key(s).

The computing device then generates a new key in the key store and encrypts the newly generated key with a corresponding unique value, in operation 606. The new key may be randomly generated (e.g., using a random number generator), and an encrypted form of the new key may be saved to the key store. In at least some embodiments, the unique value may be obtained based on the new PIN. By way of example, the computing device may obtain the unique value corresponding to the new PIN by combining the new PIN with some static information, such as device identifying information for the computing device. For example, the new PIN and a serial number of the computing device may be combined (by standard concatenation), and the combined information may be set as the argument of a selected function. In some embodiments, the selected function may be a cryptographic hash function. For example, the selected function may be a key derivation function, such as the "scrypt" algorithm. The output of the selected function may be set as the unique value In operation 608, the computing device encrypts a primary credential of the computing device using the generated new key. As described above, the primary credential represents a unique unlock credential that is set in compliance with the operating system's user account model for accessing a specific user account. The primary credential may, for example, be saved in memory (on disk or in a key store). The encrypted form of the primary credential is then stored in memory, in operation 610.

Example E-commerce Platform

Although integration with a commerce platform is not required, in some embodiments, the methods disclosed herein may be performed on or in association with a commerce platform such as an e-commerce platform. Therefore, an example of a commerce platform will be described.

Figure 7:
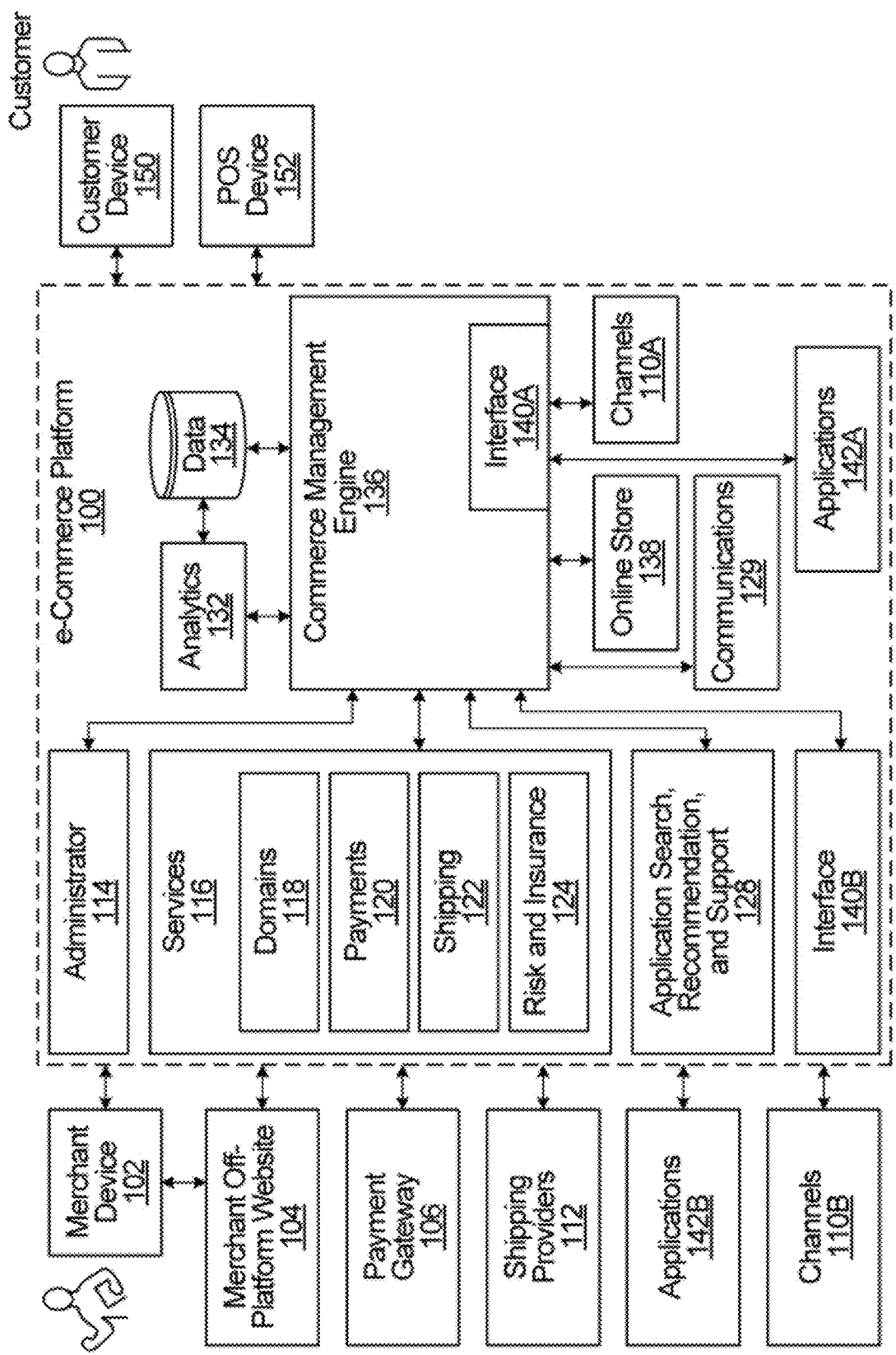
FIG. 7 is a block diagram of an e-commerce platform, in accordance with an example embodiment.

FIG. 7 illustrates an example e-commerce platform 100, according to one embodiment. The e-commerce platform 100 may be exemplary of the e-commerce platform 105 described with reference to FIG. 2. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 7, the facilities are deployed through a machine, service or engine that executes computer software, modules, program codes, and/or instructions in one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point-of-sale (POS) devices 152 in physical locations (e.g., a physical storefront or other location such as through a kiosk, terminal, reader, printer, 3D printer, and the like). The example computing device 200 of FIG. 1 may be exemplary of each POS device 152. In particular, the POS devices 152 associated with the e-commerce platform 100 may be configured to implement any one or more of the example methods 300 to 600 described above with reference to FIGS. 3 to 6.

A merchant may utilize the e-commerce platform 100 as a sole commerce presence with customers, or in conjunction with other merchant commerce facilities, such as through a physical store (e.g., "brick-and-mortar" retail stores), a merchant off-platform website 104 (e.g., a commerce Internet website or other internet or web property or asset supported by or on behalf of the merchant separately from the e-commerce platform 100), an application 142B, and the like. However, even these "other" merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through "buy buttons" that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point-of-sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment facility 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 8:
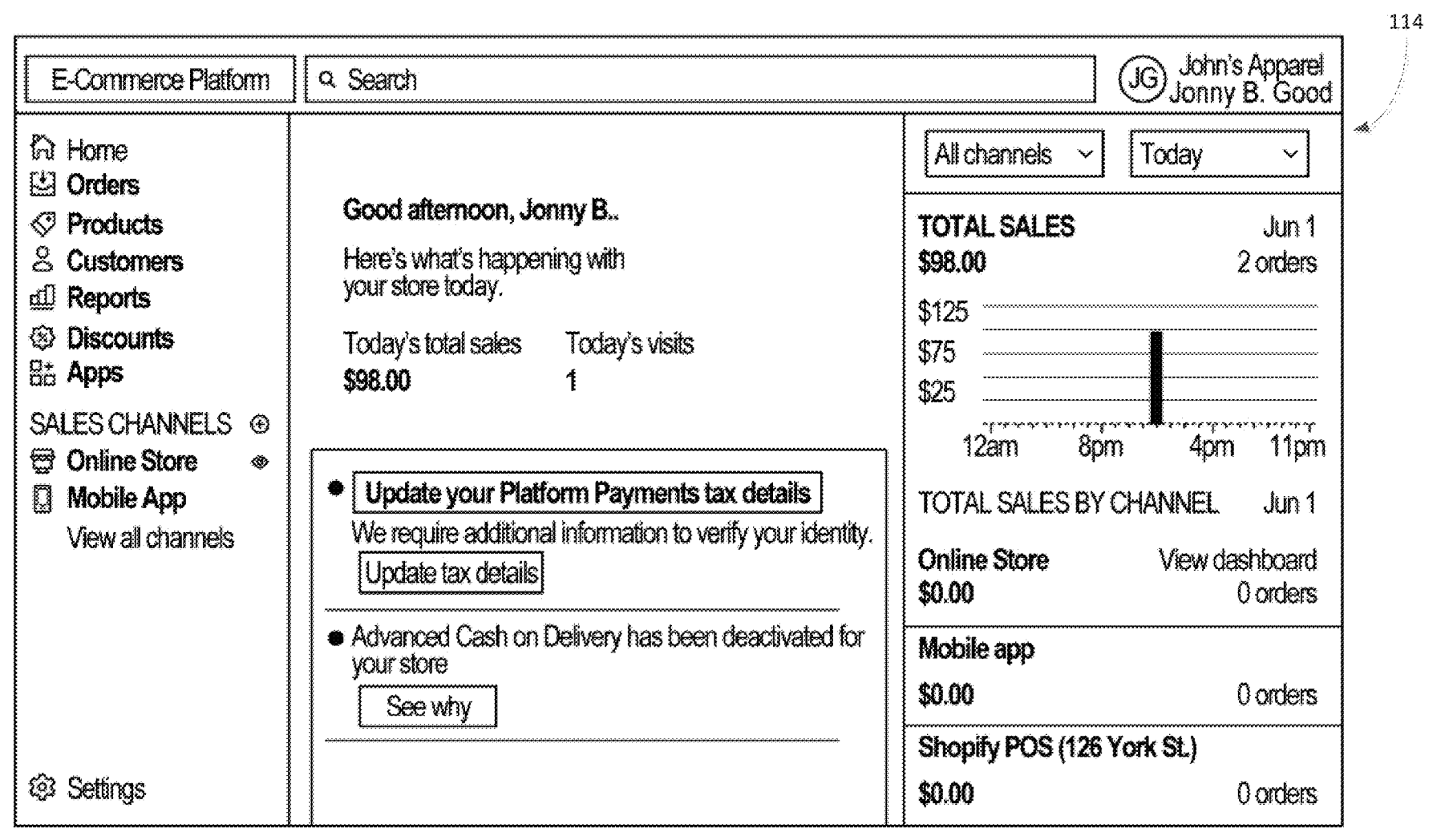

FIG. 8 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 8. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 7, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
receiving, via a computing device in a locked state, input of a first PIN;
determining that the first PIN is associated with a first cryptographic key that is stored in a memory, wherein the determining includes:
computing a unique value based on the first PIN; and
iterating through a plurality of stored cryptographic keys corresponding to authorized PINs for the computing device to determine if any of the cryptographic keys is protected using the unique value, the determining including, for each cryptographic key:
obtaining a ciphertext based on encrypting the cryptographic key using the unique value; and
comparing the ciphertext and a stored encrypted form of the cryptographic key in order to identify a match;
responsive to determining that the first PIN is associated with the first cryptographic key, retrieving, from the memory, an encrypted form of a first credential that is associated with the first cryptographic key;
recovering the first credential from the encrypted form using the first cryptographic key; and
causing the computing device to be unlocked using the recovered first credential.

2. The method of claim 1, wherein recovering the first credential comprises decrypting the encrypted form using the first cryptographic key.

3. The method of claim 1, wherein computing the unique value comprises applying a key derivation function to an input representing a combination of the first PIN and a device identifier associated with the computing device.

4. The method of claim 1, wherein determining that the first PIN is associated with the first cryptographic key comprises querying a lookup table stored in the memory to identify a cryptographic key that is stored in association with the first PIN.

5. The method of claim 1, wherein the first cryptographic key comprises a randomly-generated key.

6. The method of claim 1, further comprising:
receiving a plurality of authorized PINs associated with the computing device;
for each of the plurality of authorized PINs:
generating a random key; and
storing the random key in association with the authorized PIN in the memory.

7. The method of claim 6, further comprising, for each of the stored random keys:
encrypting the first credential using the random key to obtain an encrypted first credential; and
storing, in the memory, the encrypted first credential in association with the random key.

8. The method of claim 6, further comprising, for each of the plurality of authorized PINs:
computing a hash value based on the authorized PIN;
encrypting the random key that is stored in association with the authorized PIN using the computed hash value; and
storing, in the memory, the encrypted random key.

9. The method of claim 1, further comprising:
receiving a request to update a first authorized PIN associated with the computing device;
in response to receiving the request:
identifying one or more keys that are stored in the memory in association with the first authorized PIN;
deleting the identified keys from the memory; and
generating new keys associated with the first authorized PIN.

10. A computing device, comprising:
a processor; and
a memory coupled to the processor, the memory storing instructions that, when executed by the processor, are to cause the processor to:
receive, in a locked state of the computing device, input of a first PIN;
determine that the first PIN is associated with a first cryptographic key that is stored in a memory, wherein the determining includes:
computing a unique value based on the first PIN; and
iterating through a plurality of stored cryptographic keys corresponding to authorized PINs for the computing device to determine if any of the cryptographic keys is protected using the unique value, the determining including, for each cryptographic key:
obtaining a ciphertext based on encrypting the cryptographic key using the unique value; and
comparing the ciphertext and a stored encrypted form of the cryptographic key in order to identify a match;
responsive to determining that the first PIN is associated with the first cryptographic key, retrieve, from the memory, an encrypted form of a first credential that is associated with the first cryptographic key;
recover the first credential from the encrypted form using the first cryptographic key; and
cause the computing device to be unlocked using the recovered first credential.

11. The computing device of claim 10, wherein recovering the first credential comprises decrypting the encrypted form using the first cryptographic key.

12. The computing device of claim 10, wherein computing the unique value comprises applying a key derivation function to an input representing a combination of the first PIN and a device identifier associated with the computing device.

13. The computing device of claim 10, wherein determining that the first PIN is associated with the first cryptographic key comprises querying a lookup table stored in the memory to identify a cryptographic key that is stored in association with the first PIN.

14. The computing device of claim 10, wherein the first cryptographic key comprises a randomly-generated key.

15. The computing device of claim 10, wherein the instructions, when executed, are to further cause the processor to:
receive a plurality of authorized PINs associated with the computing device;
for each of the plurality of authorized PINs:
generate a random key; and
store the random key in association with the authorized PIN in the memory.

16. The computing device of claim 15, wherein the instructions, when executed, are to further cause the processor to, for each of the stored random keys:
encrypt the first credential using the random key to obtain an encrypted first credential; and
store, in the memory, the encrypted first credential in association with the random key.

17. The computing device of claim 15, wherein the instructions, when executed, are to further cause the processor to, for each of the plurality of authorized PINs:
compute a hash value based on the authorized PIN;
encrypt the random key that is stored in association with the authorized PIN using the computed hash value; and
store, in the memory, the encrypted random key.

18. The computing device of claim 10, wherein the instructions, when executed, are to further cause the processor to:
receive a request to update a first authorized PIN associated with the computing device;
in response to receiving the request:
identify one or more keys that are stored in the memory in association with the first authorized PIN;
delete the identified keys from the memory; and
generating new keys associated with the first authorized PIN.

19. A non-transitory, computer-readable medium storing computer-executable instructions that, when executed by a processor, are to cause the processor to:
receive, via a computing device in a locked state, input of a first PIN;
determine that the first PIN is associated with a first cryptographic key that is stored in a memory, wherein the determining includes:
computing a unique value based on the first PIN;
iterating through a plurality of stored cryptographic keys corresponding to authorized PINs for the computing device to determine if any of the cryptographic keys is protected using the unique value, the determining including, for each cryptographic key:

obtaining a ciphertext based on encrypting the cryptographic key using the unique value; and comparing the ciphertext and a stored encrypted form of the cryptographic key in order to identify a match;

responsive to determining that the first PIN is associated with the first cryptographic key, retrieve, from the memory, an encrypted form of a first credential that is associated with the first cryptographic key;

recover the first credential from the encrypted form using the first cryptographic key; and cause the computing device to be unlocked using the recovered first credential.

20. The computer-readable medium of claim 19, wherein recovering the first credential comprises decrypting the encrypted form using the first cryptographic key.

21. The computer-readable medium of claim 19, wherein computing the unique value comprises applying a key derivation function to an input representing a combination of the first PIN and a device identifier associated with the computing device.

\* \* \* \* \*